(12) United States Patent
Jeon et al.

(10) Patent No.: US 9,046,049 B2
(45) Date of Patent: Jun. 2, 2015

(54) APPARATUS AND METHOD FOR CONTROLLING FUEL INJECTION IN A BI-FUEL VEHICLE RUNNING ON TWO FUELS, I.E. GASOLINE AND LPG

(75) Inventors: Byung Chun Jeon, Changwon-si (KR); Hu Rak Choi, Yongin-si (KR); Ji Won Kang, Gunpo-si (KR)

(73) Assignee: KEFICO CORPORATION, Gunpo-si, Gyeonggi-do (KR)

( * ) Notice: Subject to any disclaimer, the term of this patent is extended or adjusted under 35 U.S.C. 154(b) by 615 days.

(21) Appl. No.: 13/391,259

(22) PCT Filed: Jul. 29, 2010

(86) PCT No.: PCT/KR2010/005007
§ 371 (c)(1),
(2), (4) Date: Feb. 17, 2012

(87) PCT Pub. No.: WO2011/021793
PCT Pub. Date: Feb. 24, 2011

(65) Prior Publication Data
US 2012/0150418 A1    Jun. 14, 2012

(30) Foreign Application Priority Data

Aug. 19, 2009    (KR) .................. 10-2009-0076629

(51) Int. Cl.
*F02D 41/30*    (2006.01)
*F02D 41/00*    (2006.01)
(Continued)

(52) U.S. Cl.
CPC ........ *F02D 41/0025* (2013.01); *F02D 19/0647* (2013.01); *F02D 19/081* (2013.01);
(Continued)

(58) Field of Classification Search
CPC ............ F02D 19/0647; F02D 19/0613; F02D 19/081; F02D 19/0025; F02D 19/061; F02D 19/0692; F02M 21/0287

USPC ................... 123/525, 575; 701/103, 104, 105
See application file for complete search history.

(56) References Cited

U.S. PATENT DOCUMENTS

| 6,591,817 B2* | 7/2003 | Deutsch ......................... 123/525 |
| 7,918,207 B2* | 4/2011 | Pursifull et al. ............... 123/300 |

(Continued)

FOREIGN PATENT DOCUMENTS

| JP | 2003-065112 A | 3/2003 |
| JP | 2004-052560 A | 2/2004 |

(Continued)

OTHER PUBLICATIONS

International Search Report dated Apr. 4, 2011 of PCT/KR2010/005007 which is the parent application—6 pages.

*Primary Examiner* — Thomas Moulis
*Assistant Examiner* — Elizabeth Hadley
(74) *Attorney, Agent, or Firm* — Knobbe Martens Olson & Bear, LLP (57) ABSTRACT

A method of controlling fuel injection of a bi-fuel vehicle running on gasoline and liquefied petroleum gas (LPG), and more particularly, a method of controlling fuel injection of a bi-fuel vehicle having an engine running on gasoline and LPG, capable of simultaneously controlling supply systems and injectors of fuels and switching the fuels in response to a fuel switch request based on an injection ratio and an injection time of each fuel is provided. Thus, fuels may be switched stably and efficiently, output reduction and exhaust gas increase due to deviation of an air-fuel ratio while switching fuels may be prevented, and fuels may be appropriately switched. Furthermore, mechanical stress generated while switching fuels may be minimized and stable driving may be provided. Accordingly, the reliability of a bi-fuel vehicle simultaneously using gasoline and LPG may be improved and the competitiveness of bi-fuel vehicle products may also be improved.

14 Claims, 6 Drawing Sheets

(51) Int. Cl.
  *F02D 19/06* (2006.01)
  *F02D 19/08* (2006.01)
  *F02M 21/02* (2006.01)

(52) U.S. Cl.
  CPC ........ *F02D2250/21* (2013.01); *F02M 21/0287* (2013.01); *Y02T 10/36* (2013.01); *Y02T 10/32* (2013.01); *F02D 19/061* (2013.01); *F02D 19/0692* (2013.01); *F02D 19/0613* (2013.01)

(56) References Cited

U.S. PATENT DOCUMENTS

| | | | |
|---|---|---|---|
| 7,949,460 B2* | 5/2011 | Song et al. | 701/103 |
| 8,267,064 B2* | 9/2012 | Martin et al. | 123/299 |
| 8,275,538 B2* | 9/2012 | Surnilla et al. | 701/113 |
| 8,498,799 B2* | 7/2013 | Matthews et al. | 701/104 |
| 2004/0139944 A1* | 7/2004 | Nakano et al. | 123/406.47 |
| 2009/0024301 A1* | 1/2009 | Volpato | 701/103 |
| 2009/0150050 A1* | 6/2009 | Mashida et al. | 701/103 |
| 2011/0017174 A1* | 1/2011 | Ulrey et al. | 123/456 |
| 2011/0155102 A1* | 6/2011 | Ten Broeke | 123/446 |
| 2012/0143480 A1* | 6/2012 | Pursifull | 701/105 |
| 2014/0130776 A1* | 5/2014 | Caley | 123/445 |

FOREIGN PATENT DOCUMENTS

| | | |
|---|---|---|
| KR | 10-0580573 B1 | 5/2006 |
| KR | 10-0852600 B1 | 8/2008 |

* cited by examiner

APPARATUS AND METHOD FOR CONTROLLING FUEL INJECTION IN A BI-FUEL VEHICLE RUNNING ON TWO FUELS, I.E. GASOLINE AND LPG

TECHNICAL FIELD

The present invention relates to an apparatus and method of controlling fuel injection of a bi-fuel vehicle running on gasoline and liquefied petroleum gas (LPG), and more particularly, to an apparatus and method of controlling fuel injection of a bi-fuel vehicle having an engine running on gasoline and LPG, capable of simultaneously controlling supply systems and injectors of fuels and switching the fuels in response to a fuel switch request based on an injection ratio and an injection time of each fuel, by using an electronic control unit (ECU) for integrally controlling gasoline injection and liquefied petroleum injection (LPI), so as to prevent an output reduction and an exhaust gas increase due to a deviation of an air-fuel ratio while is switching fuels, and to appropriately switch the fuels.

BACKGROUND ART

In general, as an automotive fuel, liquefied petroleum gas (LPG) is less expensive and has a clean exhaust gas in comparison to gasoline.

Also, an LPG engine may be driven at a high compression ratio without knocking due to a high octane number, may theoretically have a high output in comparison to a gasoline engine due to a high heating value per unit mass, may lose a small amount of lubricating oil, and may be warmed up fast.

Currently, due to the above advantages, the number of LPG vehicles is increasing and, particularly, liquefied petroleum injection (LPI) or liquid phase LPG injection (LPLI) systems for injecting LPG in a liquid phase to reduce an exhaust gas and to improve an output are popular. Despite the above advantages, due to a small number of LPG filling stations in comparison to gasoline filling stations, bi-fuel vehicles running on gasoline and LPG are demanded. Most bi-fuel vehicles use a combination of an LPG evaporating system and a gasoline injection system, and such vehicles are limited to satisfy tightened environmental regulations. Accordingly, current bi-fuel vehicles are more focused on a combination of an LPG liquefied injection system and a gasoline injection system.

In particular, these bi-fuel vehicles allow users to switch fuels between gasoline and LPG. Here, when a fuel switch signal is input, if a previous fuel is in a cut state, it is immediately switched to a replacing fuel. If the previous fuel is not in the cut state, a cylinder is counted until the previous fuel is completely injected, the injection of the previous fuel is stopped when the counting is completed, and injection is performed by adding a correction value to an injection amount of the replacing fuel, thereby switching fuels.

However, in the above fuel switching method, since a deviation of an air-fuel ratio may occur, an exhaust gas may be increased and an accidental fire may be caused.

Also, if fuels are switched, an abrupt output variation may occur (due to a difference in torque characteristics between fuels). The output variation may increase a mechanical stress on other components of a vehicle and thus a user may be under great pressure while driving the vehicle.

Furthermore, the output variation of an engine may cause inconvenience while driving a vehicle and may cause great and small traffic accidents.

DETAILED DESCRIPTION OF THE INVENTION

Technical Problem

The present invention provides an apparatus and method of controlling fuel injection of a bi-fuel vehicle having an engine running on gasoline and liquefied petroleum gas (LPG), capable of preventing an output reduction and an exhaust gas increase due to a deviation of an air-fuel ratio while switching fuels, and of appropriately switching the fuels.

For this, the present invention provides an apparatus and method of controlling fuel injection of a bi-fuel vehicle having an engine running on gasoline and LPG, capable of simultaneously controlling supply systems and injectors of fuels and switching the fuels based on an injection ratio and an injection time of each fuel, by using an integral electronic control unit (ECU) for simultaneously controlling gasoline injection and liquefied petroleum injection (LPI) so as to determine whether to switch fuels.

Technical Solution

According to an aspect of the present invention, there is provided an apparatus for controlling fuel injection of a bi-fuel vehicle running on gasoline and liquefied petroleum gas (LPG), the apparatus including an engine using gasoline and LPG as fuels; a gasoline driver including a gasoline fuel pump and a gasoline injector; a liquefied petroleum injection (LPI) driver including an LPI fuel pump and an LPI injector; and a controller for controlling the gasoline driver and the LPI driver, and increasing and reducing ratios of fuels injected into the engine upon a fuel switch request while simultaneously injecting the fuels.

The controller may include a calculation unit for calculating an injection amount of a replacing fuel if a fuel switch request is input, and calculating based on the calculated injection amount an injection ratio and an injection time of a replacing fuel, and an injection ratio and an injection time of a previous fuel; a determination unit for determining whether to solely inject the previous fuel based on the injection time of is the replacing fuel calculated by the calculation unit, and determining whether to solely inject the replacing fuel based on the injection time of the previous fuel calculated by the calculation unit; and a control unit for controlling the calculation unit to calculate the injection ratio and the injection time of the previous fuel if the determination unit determines not to solely inject the previous fuel, and controlling the gasoline driver and the LPI driver to inject fuels at corresponding injection ratios calculated by the calculation unit if the determination unit determines not to solely inject the replacing fuel.

The control unit my control the gasoline driver and the LPI driver to solely inject the previous fuel if the determination unit determines to solely inject the previous fuel, and to solely inject the replacing fuel if the determination unit determines to solely inject the replacing fuel.

The determination unit may determine to solely inject the previous fuel if the injection time of the replacing fuel calculated by the calculation unit is less than a minimum injection time, and may determine to solely inject the replacing fuel if the injection time of the previous fuel calculated by the calculation unit is less than the minimum injection time.

According to another aspect of the present invention, there is provided a method of controlling fuel injection of a bi-fuel vehicle running on gasoline and liquefied petroleum gas (LPG), the method including a) calculating an injection amount of a replacing fuel if a fuel switch request is input; b)

calculating an injection ratio and an injection time of the replacing fuel based on the injection amount calculated in the step a); c) solely injecting a previous fuel if the calculated injection time of the replacing fuel is less than a minimum injection time, and calculating an injection ratio and an injection time of the previous fuel if the injection time of the replacing fuel is equal to or greater than the minimum injection time; and d) solely injecting the replacing fuel if the calculated injection time of the previous fuel is less than the minimum injection time, and simultaneously injecting fuels at corresponding injection ratios if the injection time of the previous fuel is equal to or greater than the minimum injection time.

The step a) may include a-1) selecting a desired fuel; a-2) determining whether to switch fuels; and a-3) driving a liquefied petroleum injection (LPI) system to press a fuel rail and calculating an injection amount of LPG if the replacing fuel is LPG, and driving a gasoline supply system to operate a fuel pump and calculating an injection is amount of gasoline if the replacing fuel is gasoline.

The step a-3) may include a-3-1) comparing a pressure of the fuel rail to a set target pressure if the replacing fuel is LPG, and checking whether to re-switch fuels if the pressure of the fuel rail is less than the target pressure; and a-3-2) solely injecting gasoline and canceling a fuel switch if fuels need to be re-switched, and returning to the step a-3) if fuels does not need to be re-switched.

The step b) may include b-1) checking whether an engine for the previous fuel operates; b-2) controlling the replacing fuel to be solely injected and turning off a supply system of the previous fuel if the engine for the previous fuel does not operate, and calculating the injection ratio of the replacing fuel if the engine for the previous fuel operates; and b-3) calculating the injection time of the replacing fuel based on the calculated injection ratio of the replacing fuel.

In the step b-3), the injection ratio of the replacing fuel may be calculated by adding a correction value to a previous injection ratio of the replacing fuel.

The step c) may include c-1) comparing the injection time of the replacing fuel to the minimum injection time; c-2) solely injecting the previous fuel if the injection time of the replacing fuel is less than the minimum injection time, and calculating the injection ratio of the previous fuel if the injection time of the replacing fuel is equal to or greater than the minimum injection time; and c-3) calculating the injection time of the previous fuel based on the calculated injection ratio of the previous fuel.

The step c-2) may include c-2-1) checking whether to be switched to the replacing fuel; c-2-2) returning to the step b-1) if not switched to the replacing fuel, and determining whether a mono-fuel is injected if switched to the replacing fuel; and c-2-3) solely injecting the previous fuel and turning off a supply system of the replacing fuel in case that the mono-fuel is injected, and switching the replacing fuel to the previous fuel in case that the mono-fuel is not injected.

In the step c-2), the injection ratio of the previous fuel may be calculated by subtracting the injection ratio of the replacing fuel from a previous injection ratio of the previous fuel.

The step d) may include d-1) comparing the injection time of the previous fuel to the minimum injection time; and d-2) controlling the replacing fuel to be solely injected and turning off a supply system of the previous fuel if the injection time of the previous fuel is less than the minimum injection time, and controlling the previous fuel and the replacing fuel to be simultaneously injected if the injection time of the is previous fuel is equal to or greater than the minimum injection time.

The step d-2) may include d-2-1) checking whether to be switched to the replacing fuel; d-2-2) returning to the step b-1) if not switched to the fuel, and determining whether a mono-fuel is injected if switched to the replacing fuel; and d-2-3) solely injecting the previous fuel and turning off a supply system of the replacing fuel in case the mono-fuel injection state, and switching the replacing fuel to the previous fuel in case that the mono-fuel is not injected.

BEST MODE FOR CARRYING OUT THE INVENTION

An apparatus and method of controlling fuel injection of a bi-fuel vehicle running on gasoline and liquefied petroleum gas (LPG), according to the present invention, may be variously used. In the following description, configurations of and correlations between an engine using gasoline and LPG, a gasoline fuel pump, a gasoline injector, a liquefied petroleum injection (LPI) fuel pump, an LPI injector, a fuel rail pressure sensor, a temperature sensor, and an electronic control unit (ECU) for controlling the other elements may be variously modified according to a demand of one of ordinary skill in the art, and thus are not limited to specific ones. Hereinafter, a method of controlling a bi-fuel supply system by the ECU will now be described by explaining embodiments of the present invention with reference to the attached drawings.

Figure 1:
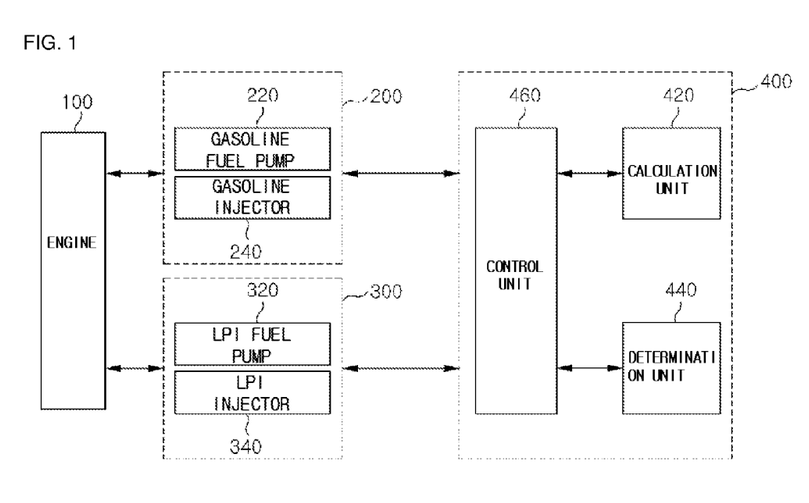
FIG. 1 is a block diagram of an apparatus for controlling fuel injection of a bi-fuel vehicle running on gasoline and liquefied petroleum gas (LPG), according to an embodiment of the present invention.

FIG. 1 is a block diagram of an apparatus for controlling fuel injection of a bi-fuel vehicle running on gasoline and LPG, according to an embodiment of the is present invention.

The apparatus includes an engine 100 using gasoline and LPG as fuels, a gasoline driver 200 including a gasoline fuel pump 220 and a gasoline injector 240, an LPI driver 300 including an LPI fuel pump and an LPI injector 340, and a controller 400 for controlling the gasoline driver 200 and the LPI driver 300, and increasing and reducing ratios of fuels injected into the engine 100 upon a fuel switch request while simultaneously injecting the fuels.

In this case, the controller 400 includes a calculation unit 420, a determination unit 440, and a control unit 460.

The calculation unit 420 calculates an injection amount of a replacing fuel if a fuel switch request is input, and calculates based on the calculated injection amount an injection ratio and an injection time of the replacing fuel, and an injection ratio and an injection time of a previous fuel.

The determination unit 440 determines whether to solely inject the previous fuel based on the injection time of the replacing fuel calculated by the calculation unit 420, and determines whether to solely inject the replacing fuel based on the injection time of the previous fuel calculated by the calculation unit 420. Here, the determination unit 440 determines to solely inject the previous fuel if the injection time of the replacing fuel is less than a minimum injection time, and determines to solely inject the replacing fuel if the injection time of the previous fuel is less than the minimum injection time.

The control unit 460 controls the calculation unit 420 to calculate the injection ratio and the injection time of the previous fuel if the determination unit 440 determines not to solely inject the previous fuel, and controls the gasoline driver 200 and the LPI driver 300 to inject fuels at corresponding injection ratios calculated by the calculation unit 420 if the determination unit 440 determines not to solely inject the replacing fuel. Here, the control unit 460 controls the gasoline driver 200 and the LPI driver 300 to solely inject the previous fuel if the determination unit 440 determines to solely inject the previous fuel, and to solely inject the replacing fuel if the determination unit 440 determines to solely inject the replacing fuel.

Figure 2:
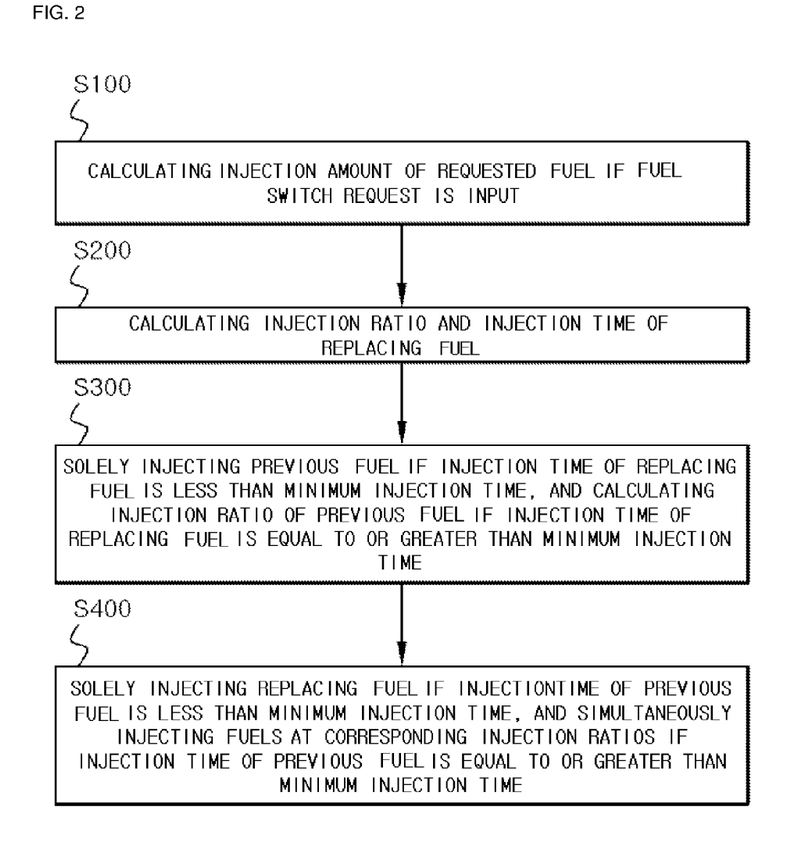
FIG. 2 is a flowchart of a method of controlling fuel injection of a bi-fuel vehicle running on gasoline and LPG, according to an embodiment of the present invention.

FIG. 2 is a flowchart of a method of controlling fuel injection of a bi-fuel vehicle running on gasoline and LPG, according to an embodiment of the present invention.

If a fuel switch request is input to an ECU, an injection amount of the replacing is fuel is calculated (S100).

Figure 3A:
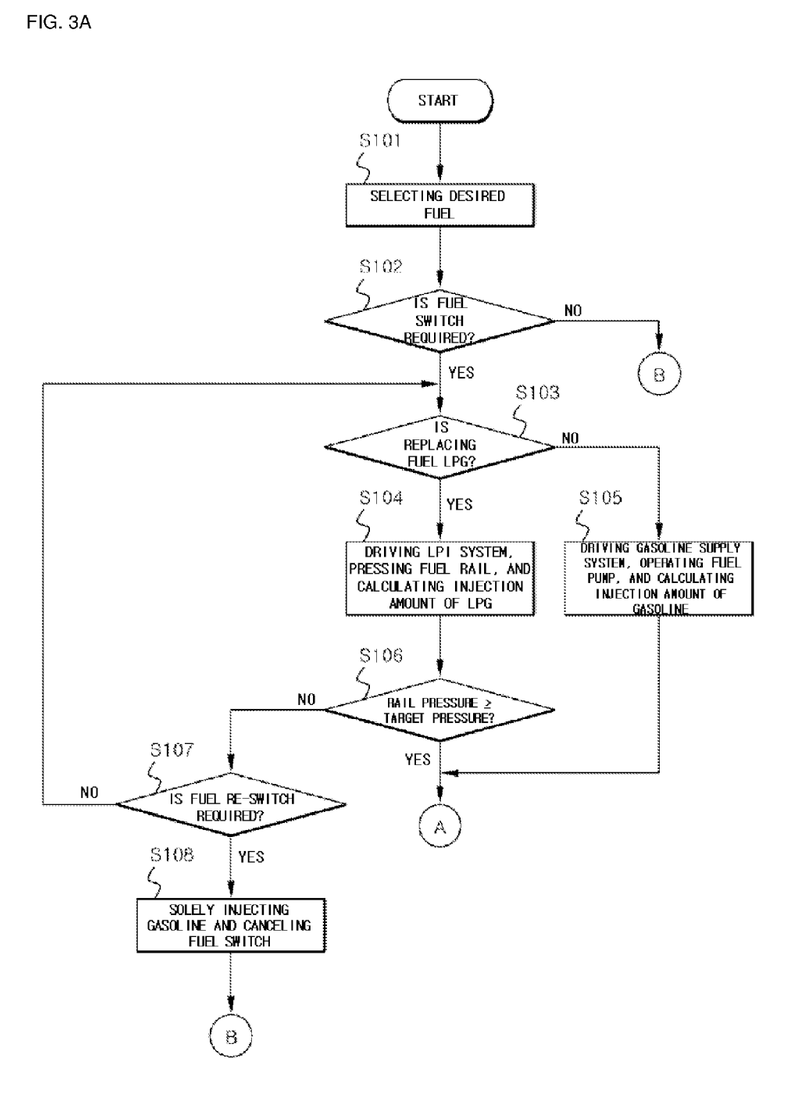
FIGS. 3A through 3C illustrate a detailed flowchart of the method of FIG. 2.

In more detail, as illustrated in FIG. 3A, if a desired fuel is selected (S101), it is determined whether to switch fuels by checking whether the desired fuel corresponds to a currently injected fuel (S102), and the replacing fuel is determined if a fuel switch is required.

If the replacing fuel is LPG (S103), an LPG supply system is driven to press a fuel rail, and then an injection amount of supplied LPG is calculated (S104).

If the replacing fuel is gasoline (S103), a gasoline supply system is driven to operate a fuel pump and an injection amount of supplied gasoline is calculated (S105).

Here, if the replacing fuel is LPG, it is checked whether the pressure of the fuel rail reaches a target pressure (a minimum pressure for using LPG) (S106). If the pressure of the fuel rail does not reach the target pressure, it is determined whether to re-switch fuels (S107).

If it is determined to re-switch fuels, gasoline is controlled to be solely injected and the fuel switch request is canceled (S108). If it is determined not to re-switch fuels, the method returns to S103 of FIG. 3A.

If the injection amount of the replacing fuel is calculated as described above, an injection ratio and an injection time of the replacing fuel are calculated based on the calculated injection amount (S200).

Figure 3B:
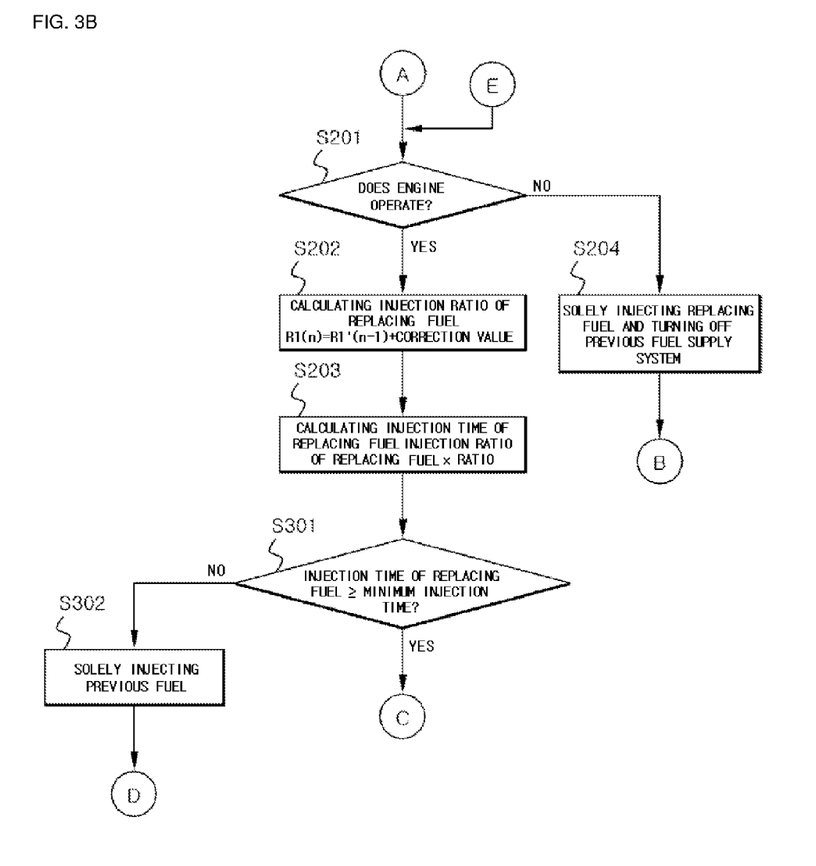

In more detail, as illustrated in FIG. 3B, it is determined whether an engine operates (S201). If the engine operates, an injection ratio of the replacing fuel is calculated (S202).

Here, the injection ratio is calculated by adding a correction value to a previous injection ratio of the replacing fuel (S202). In this case, the correction value may be determined differently according to the state of the engine.

If the injection ratio of the replacing fuel is calculated as described above, an injection time of the replacing fuel is calculated by multiplying the calculated injection ratio of the replacing fuel by a set ratio (S203). Here, the set ratio may have various values according to a demand of one of ordinary skill in the art.

If the engine does not operates (S201), the replacing fuel is controlled to be solely injected, a supply system of the previous fuel is turned off (S204).

If the injection time of the replacing fuel is calculated as described above, it is determined whether to solely inject the previous fuel by comparing the calculated is injection time to a minimum injection time, and an injection ratio and an injection time of the previous fuel are calculated (S300).

Figure 3C:
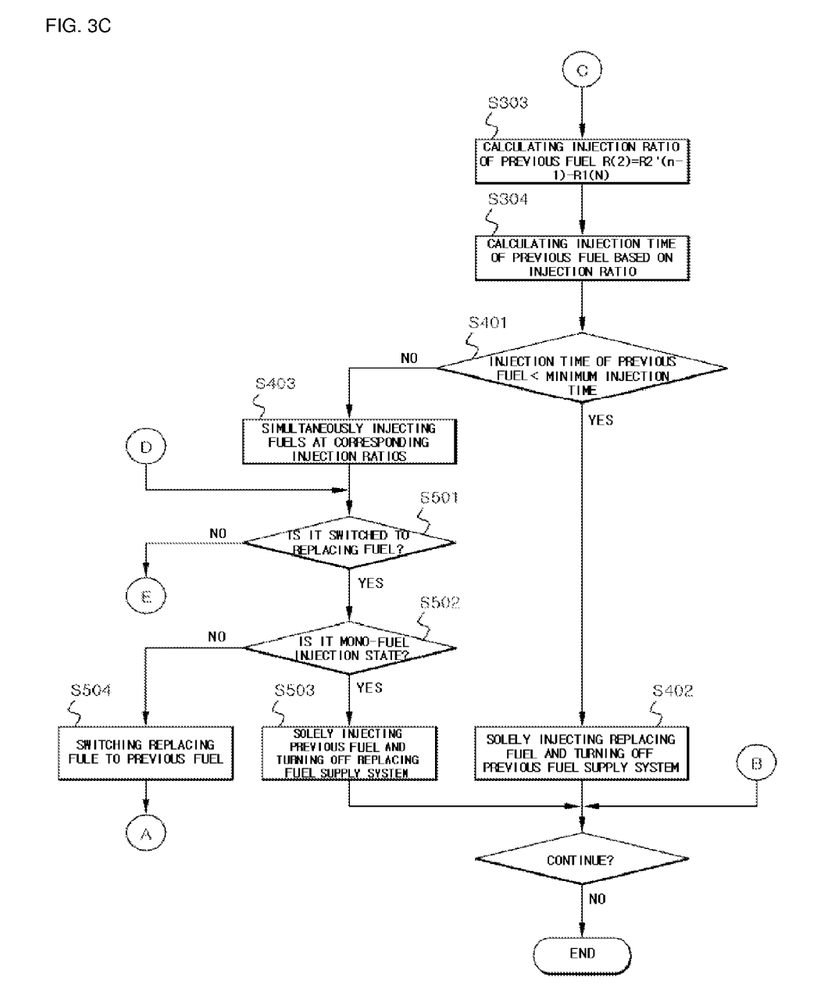

In more detail, as illustrated in FIGS. 3B and 3C, the injection time of the replacing fuel is compared to the minimum injection time (S301).

If the injection time of the replacing fuel is less (shorter) than the minimum injection time, the previous fuel is solely injected (S302). After it is checked whether it is switched to the replacing fuel (S501), the method returns to S201 of FIG. 3B if it is not switched to the replacing fuel, and it is determined whether it is a mono-fuel injection state (S502) if it is switched to the replacing fuel.

If it is determined that it is the mono-fuel injection state, the previous fuel is solely injected and a supply system of the replacing fuel is turned off (S503), and the replacing fuel is switched to the previous fuel (S504) and the method returns to S201 of FIG. 3B if it is not the mono-fuel injection state.

If the injection time of the replacing fuel is greater (longer) than the minimum injection time, the injection ratio of the previous fuel is calculated (S303).

Here, the injection ratio of the previous fuel is calculated by subtracting the injection ratio of the replacing fuel from a previous injection ratio of the previous fuel (S303).

If the injection ratio of the previous fuel is calculated, the injection time of the previous fuel is calculated based on the calculated injection ratio of the previous fuel (S304).

If the injection time of the previous fuel is calculated as described above, after the injection time of the previous fuel is compared to the minimum injection time, the replacing fuel is solely injected if the injection time of the previous fuel is less than the minimum injection time, and fuels are simultaneously injected at corresponding injection ratios if the injection time of the previous fuel is equal to or greater than the minimum injection time (S400).

In more detail, as illustrated in FIG. 3C, after the calculated injection time of the previous fuel is compared to the minimum injection time (S401), if the injection time of the previous fuel is less than the minimum injection time, the replacing fuel is controlled to be solely injected and a supply system of the previous fuel is turned off (S402).

If the injection time of the previous fuel is equal to or greater than the minimum injection time (S401), the previous fuel and the replacing fuel are controlled to be simultaneously injected (S403).

After it is checked whether it is switched to the replacing fuel (S501), the method returns to S201 of FIG. 3B if it is not switched to the replacing fuel, and it is determined whether it is a mono-fuel injection state (S502) if it is switched to the replacing fuel.

If it is determined that it is the mono-fuel injection state, the previous fuel is solely injected and a supply system of the replacing fuel is turned off (S503), and the replacing fuel is switched to the previous fuel (S504) and the method returns to operation S201 of FIG. 3B if it is not the mono-fuel injection state.

Accordingly, according to the present invention, since fuels are switched based on an injection ratio and an injection time of each fuel, an output reduction and an exhaust gas increase due to a deviation of an air-fuel ratio while switching fuels may be prevented and the fuels may be appropriately switched.

Figure 4:
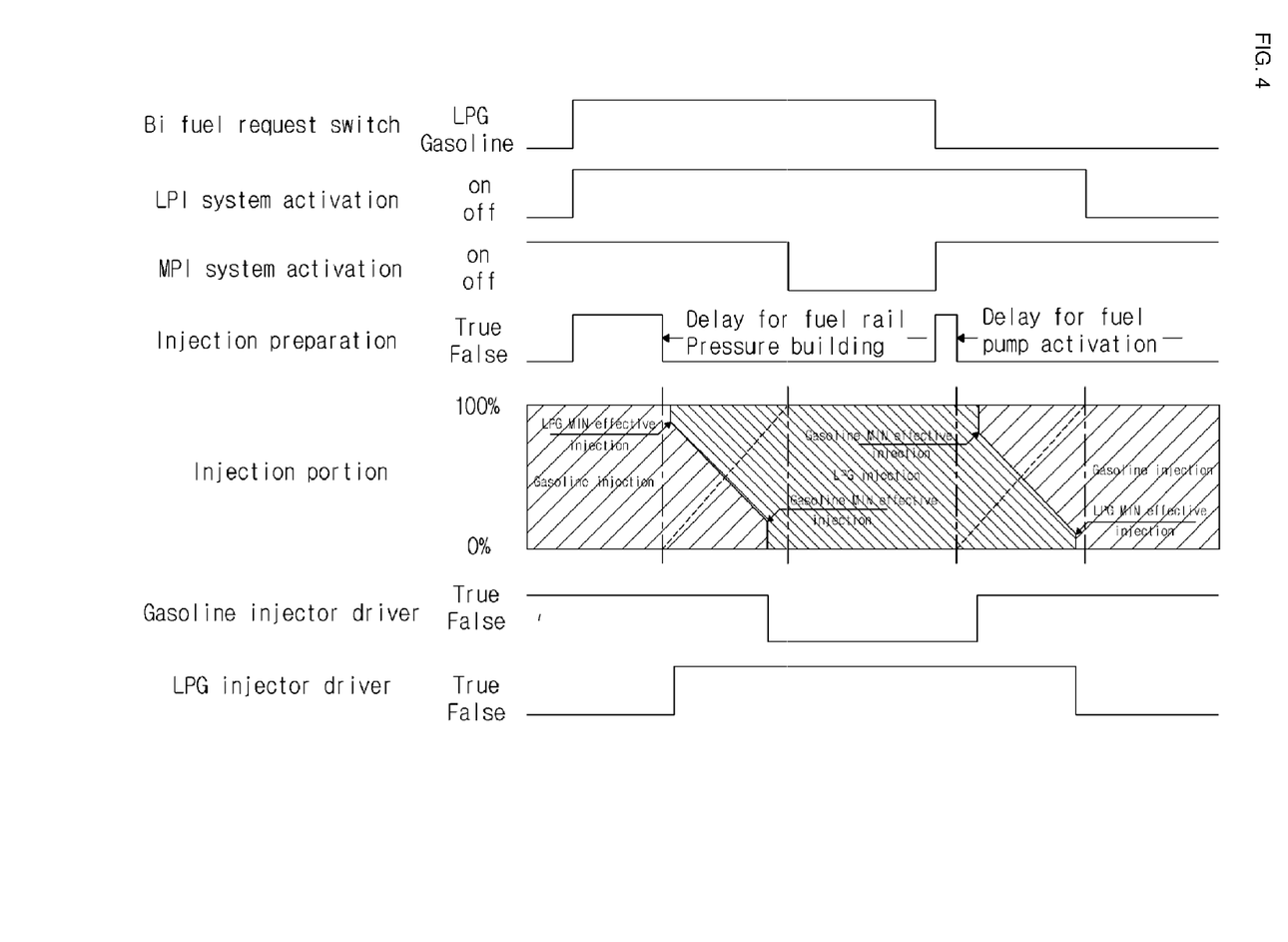
FIG. 4 is a graph showing an input signal based on a selection of gasoline or LPG, an injection ratio of each fuel, and a system operation thereof, according to an embodiment of the present invention.

FIG. 4 is a graph showing an input signal based on a selection of gasoline or LPG, an injection ratio of each fuel, and a system operation thereof, according to an embodiment of the present invention. FIG. 4 graphically shows the above-described method illustrated in FIGS. 2 and 3A through 3C.

While the present invention has been particularly shown and described with reference to exemplary embodiments thereof, it will be understood by one of ordinary skill in the art that various changes in form and details may be made therein without departing from the spirit and scope of the invention as defined by the following claims.

The exemplary embodiments should be considered in a descriptive sense only and not for purposes of limitation. Therefore, the scope of the invention is defined not by the detailed description of the invention but by the following claims, and all differences within the scope will be construed as being included in the present invention.

INDUSTRIAL APPLICABILITY

According to the present invention, a mechanical stress generated while switching fuels may be minimized and stable driving may be provided to a user of a vehicle.

Also, an abrupt output variation due to a fuel switch may be prevented and thus a deviation of an air-fuel ratio while switching fuels may be prevented.

Furthermore, a mechanical stress on other components of a vehicle may be minimized and a stable driving performance may be provided to a user of a vehicle.

In particular, the reliability of a bi-fuel vehicle simultaneously using gasoline and LPG may be improved and the competitiveness of products in the industrial field of bi-fuel vehicles may also be improved.

The invention claimed is:

1. An apparatus for controlling fuel injection of a bi-fuel vehicle running on gasoline and liquefied petroleum gas (LPG), the apparatus comprising:
    an engine using gasoline and LPG as fuels;
    a gasoline driver comprising a gasoline fuel pump and a gasoline injector;
    a liquefied petroleum injection (LPI) driver comprising an LPI fuel pump and an LPI injector; and
    a controller for controlling the gasoline driver and the LPI driver, and increasing and reducing ratios of fuels injected into the engine upon a fuel switch request while simultaneously injecting the fuels
    wherein the controller comprises:
        a calculation unit for calculating an injection amount of a replacing fuel if the fuel switch request is input, and calculating based on the calculated injection amount an injection ratio and an injection time of the replacing fuel, and an injection ratio and an injection time of a previous fuel,
        a determination unit for determining whether to solely inject the previous fuel based on the injection time of the replacing fuel calculated by the calculation unit, and determining whether to solely inject the replacing fuel based on the injection time of the previous fuel calculated by the calculation unit, and
        a control unit for controlling the calculation unit to calculate the injection ratio and the injection time of the previous fuel if the determination unit determines not to solely inject the previous fuel, and controlling the gasoline driver and the LPI driver to inject fuels at corresponding injection ratios calculated by the calculation unit if the determination unit determines not to solely inject the replacing fuel.

2. The apparatus of claim 1, wherein the control unit controls the gasoline driver and the LPI driver to solely inject the previous fuel if the determination unit determines to solely inject the previous fuel, and to solely inject the replacing fuel if the determination unit determines to solely inject the replacing fuel.

3. The apparatus of claim 1, wherein the determination unit determines to solely inject the previous fuel if the injection time of the replacing fuel calculated by the calculation unit is less than a minimum injection time, and determines to solely inject the replacing fuel if the injection time of the previous fuel calculated by the calculation unit is less than the minimum injection time.

4. A method of controlling fuel injection of a bi-fuel vehicle running on gasoline and liquefied petroleum gas (LPG), the method comprising:
    a) calculating an injection amount of a replacing fuel if a fuel switch request is input;
    b) calculating an injection ratio and an injection time of the replacing fuel based on the injection amount calculated in the step a);
    c) solely injecting a previous fuel if the calculated injection time of the replacing fuel is less than a minimum injection time, and calculating an injection ratio and an injection time of the previous fuel if the injection time of the replacing fuel is equal to or greater than the minimum injection time; and
    d) solely injecting the replacing fuel if the calculated injection time of the previous fuel is less than the minimum injection time, and simultaneously injecting fuels at corresponding injection ratios if the injection time of the previous fuel is equal to or greater than the minimum injection time.

5. The method of claim 4, wherein the step a) comprises:
    a-1) selecting a desired fuel;
    a-2) determining whether to switch fuels; and
    a-3) driving a liquefied petroleum injection (LPI) system to press a fuel rail and calculating an injection amount of LPG if the replacing fuel is LPG, and driving a gasoline supply system to operate a fuel pump and calculating an injection amount of gasoline if the replacing fuel is gasoline.

6. The method of claim 5, wherein the step a-3) comprises:
    a-3-1) comparing a pressure of the fuel rail to a set target pressure if the replacing fuel is LPG, and checking whether to re-switch fuels if the pressure of the fuel rail is less than the target pressure; and
    a-3-2) solely injecting gasoline and canceling a fuel switch if fuels need to be re-switched, and returning to the step a-3) if fuels does not need to be re-switched.

7. The method of claim 4, wherein the step b) comprises:
    b-1) checking whether an engine for the previous fuel operates;
    b-2) controlling the replacing fuel to be solely injected and turning off a supply system of the previous fuel if the engine for the previous fuel does not operate, and calculating the injection ratio of the replacing fuel if the engine for the previous fuel operates; and
    b-3) calculating the injection time of the replacing fuel based on the calculated injection ratio of the replacing fuel.

8. The method of claim 7, wherein, in the step b-3), the injection ratio of the replacing fuel is calculated by adding a correction value to a previous injection ratio of the replacing fuel.

9. The method of claim 4, wherein the step c) comprises:
    c-1) comparing the injection time of the replacing fuel to the minimum injection time;
    c-2) solely injecting the previous fuel if the injection time of the replacing fuel is less than the minimum injection time, and calculating the injection ratio of the previous fuel if the injection time of the replacing fuel is equal to or greater than the minimum injection time; and c-3) calculating the injection time of the previous fuel based on the calculated injection ratio of the previous fuel.

10. The method of claim 9, wherein the step c-2) comprises:
   c-2-1) checking whether to be switched to the replacing fuel;
   c-2-2) returning to the step b-1) if not switched to the replacing fuel, and determining whether a mono-fuel is injected if switched to the replacing fuel; and
   c-2-3) solely injecting the previous fuel and turning off a supply system of the replacing fuel in case that the mono-fuel is injected, and switching the replacing fuel to the previous fuel in case that the mono-fuel is not injected.

11. The method of claim 9, wherein, in the step c-2), the injection ratio of the previous fuel is calculated by subtracting the injection ratio of the replacing fuel from a previous injection ratio of the previous fuel.

12. The method of claim 4, wherein the step d) comprises:
   d-1) comparing the injection time of the previous fuel to the minimum injection time; and
   d-2) controlling the replacing fuel to be solely injected and turning off a supply system of the previous fuel if the injection time of the previous fuel is less than the minimum injection time, and controlling the previous fuel and the replacing fuel to be simultaneously injected if the injection time of the previous fuel is equal to or greater than the minimum injection time.

13. The method of claim 12, wherein the step d-2) comprises:
   d-2-1) checking whether to be switched to the replacing fuel;
   d-2-2) returning to the step b-1) if not switched to the replacing fuel, and determining whether a mono-fuel is injected if switched to the replacing fuel; and
   d-2-3) solely injecting the previous fuel and turning off a supply system of the replacing fuel in case that the mono-fuel is injected, and switching the replacing fuel to the previous fuel in case that the mono-fuel is not injected.

14. The method of claim 10, wherein, in the step c-2), the injection ratio of the previous fuel is calculated by subtracting the injection ratio of the replacing fuel from a previous injection ratio of the previous fuel.

* * * * *